(12) United States Patent
Pavlovic et al.

(10) Patent No.: US 11,652,320 B2
(45) Date of Patent: May 16, 2023

(54) SYSTEM AND METHOD USING A HAND-MOUNTED FORCE SENSOR TO VERIFY INSTALLATION OF CONNECTOR-POSITION-ASSURANCE ENABLED ELECTRICAL CONNECTOR

(71) Applicant: Global Inventive Consulting Inc., Etobicoke (CA)

(72) Inventors: Slobodan Pavlovic, Etobicoke (CA); Mohamad Zeidan, Bloomfield Hills, MI (US)

(73) Assignee: Global Inventive Consulting, Inc., Etobicoke (CA)

( * ) Notice: Subject to any disclaimer, the term of this patent is extended or adjusted under 35 U.S.C. 154(b) by 0 days.

(21) Appl. No.: 17/315,398

(22) Filed: May 10, 2021

(65) Prior Publication Data
US 2022/0360019 A1   Nov. 10, 2022

(51) Int. Cl.
*H01R 13/641* (2006.01)
*H01R 13/639* (2006.01)
*G01L 1/00* (2006.01)
G06F 3/01 (2006.01)

(52) U.S. Cl.
CPC ............ *H01R 13/641* (2013.01); *G01L 1/005* (2013.01); *H01R 13/639* (2013.01); *G06F 3/016* (2013.01)

(58) Field of Classification Search
CPC ..... H01R 13/641; H01R 13/639; G01L 1/005; G06F 3/016
See application file for complete search history.

(56) References Cited

U.S. PATENT DOCUMENTS

| | | | |
|---|---|---|---|
| 9,939,483 B2* | 4/2018 | Maalouf | H01R 43/26 |
| 10,184,970 B2* | 1/2019 | Maalouf | H01R 13/641 |
| 2015/0098574 A1* | 4/2015 | Fry | H04R 3/002 |
| | | | 381/56 |
| 2017/0102424 A1* | 4/2017 | Maalouf | H01R 13/502 |

FOREIGN PATENT DOCUMENTS

| | | | | |
|---|---|---|---|---|
| DE | 10308403 A1 * | 9/2004 | | B23P 19/00 |
| EP | 3871928 A1 * | 9/2021 | | A41D 19/0027 |

* cited by examiner

*Primary Examiner* — Tho D Ta
(74) *Attorney, Agent, or Firm* — Heed Law Group PLLC; Thomas P. Heed (57) ABSTRACT

The present invention is a system and method using a hand-mounted force sensor to verify installation of a CPA-enabled electrical connector. The system has at least one CPA-enabled electrical connector with a locking button; at least one hand-mounted force sensor; an interface board; a transmission channel; a system processor; a non-transitory computer readable memory element; a display; and an input. The hand-mounted force sensors have an electrical output that is proportional to the force. By interposing a force sensor between the locking button and the source of force, the force to close the locking tab can be read. The method is accomplished with the steps of mounting at least one force sensor so that it will record the force exerted when depressing a locking button of a CPA-enabled electrical connector; depressing the locking button; measuring the force; recording the force; comparing the force to a pre-determined threshold; passing the CPA-enabled electrical connector if the force was less than the pre-determined threshold and otherwise failing it.

34 Claims, 12 Drawing Sheets

SYSTEM AND METHOD USING A HAND-MOUNTED FORCE SENSOR TO VERIFY INSTALLATION OF CONNECTOR-POSITION-ASSURANCE ENABLED ELECTRICAL CONNECTOR

FIELD OF INVENTION

This invention relates to the classification of electrically-conductive connections, and to one or more sub-classifications under means for preventing, inhibiting, or avoiding incorrect coupling. Specifically, this invention is a system and method using a hand-mounted force sensor to verify.

BACKGROUND OF INVENTION

Over the past several decades, the amount of electronics in motor vehicles has increased substantially. Electronics are used to improve performance, control emissions, and provide creature comforts to the occupants and users of the motor vehicles. Motor vehicles are a challenging electrical environment due to vibration, heat, and longevity. Heat, vibration, and aging can all lead to connector failure. In fact, loose connectors, both in the assembly plant and in the field, are one of the largest failure modes for motor vehicles. Considering that just the aggregate annual accrual for warranty by all of the automotive manufacturers and their direct suppliers is estimated at between $50 billion and $150 billion, worldwide, a large failure mode in automotive is associated with a large dollar amount.

Several automotive companies and their suppliers maintain that connector failures are, in fact, the single largest failure mode and warranty cost in automotive. The specific category with the highest warranty and quality cost in automotive industry are mis-seated electrical connections. These warranty problems are caused by an incomplete connector mating process at the vehicle assembly lines, as there are no reliable methods to assure and record/verify that an electrical connector is fully mated.

Connector design has evolved numerous features in order to address this issue. One of the most common features in automotive is Connector Position Assurance ("CPA"). A CPA feature is a secondary lock that cannot be engaged until the connector is fully seated. CPA connectors have become ubiquitous in the automotive industry due to the belief that a CPA connector insures proper installation. However, CPA features have not resolved the overall warranty problems, because there is no contemporaneous method, measurement, or record proving that the CPA feature is being properly installed and deployed.

The industry currently uses sub-standard solutions for recording installation across all known connector technologies. For example, barcodes are used with CPA features. The barcode is placed in a position in which it can only be read when the CPA is fully seated. Unfortunately, this method only works if an open area exists around the CPA, so that a barcode reader can access the barcode. In most of cases such space is not available and this method is not complete solution for connector assembly process. Moreover, this method of error-proofing is expensive, as an extra employee is usually used to read the bar-code.

The automotive market has a need for system and method for measuring and documenting the correct installation of connectors using CPA features.

SUMMARY OF THE INVENTION

This summary is intended to disclose the present invention, a system and method using a hand-mounted force sensor to verify installation of a CPA-enabled electrical connector. The embodiments and descriptions are used to illustrate the invention and its utility, and are not intended to limit the invention or its use. In the illustrated embodiment, the system and method using a hand-mounted force sensor to verify installation of a CPA-enabled electrical connector has a hand-mounted force sensor. This invention works on CPA-enabled electrical connectors that have a locking button, sometimes called a locking bar.

An electrical connector will typically have a plug or male portion and a socket or female portion. In connectors with a CPA feature comprised of a locking button and locking tab, the CPA feature can be placed on either the plug or the socket. The CPA feature comprised of a locking button and locking tab can be implemented many different ways. This application will illustrate an embodiment of the present invention in which the CPA feature of a locking button is located on the plug housing with a locking tab located on the socket housing. It is understood that the CPA feature of a locking button can be located on the socket, also. This application will discuss the present invention as applied to a connector where the CPA feature is a locking button on the plug surface.

The plug is first fully inserted into the socket. When this is done, the locking button will be separated from the housing of the plug. The locking button will be rigid to the touch. By rigid, it is meant that a force is required to depress the locking button, it will not move on its own after the plug has been inserted to the socket. To complete installation, an assembler presses on the locking button until the locking button captures the locking tab which means that the plug and socket are now locked together. In its locked state, the locking button will be nearly flush with the surface of the plug housing. There will usually be features, such as a ridge, to indicate that the locking button is locked. Many time, a visual indicator is also provided.

A CPA locking button is not fool-proof; often, the locking button will skew or only partially engage when pressed. Visual inspection is often unable to ascertain if the locking button has been engaged. Due to the repetitive nature of assembly work, tactile feedback provided to the assembler often fails to highlight to the assembler that a lock is improperly installed. If the locking button is not fully engaged, the plug and socket can be separated in use due to tensile force and/or vibration.

The force required to properly lock the locking button of a CPA connector is measurable, repeatable, and recordable. This invention uses a hand-mounted force sensor to ensure the proper installation of a CPA-enabled electrical connector with locking button, by measuring the force needed to lock the locking button to its locking tab and recording it. The force sensor can be located at various positions on the palm-side of the hand: the thumb, index finger, ring finger, middle finger, pinkie, and palm.

A process flow diagram ("PFD") or work instruction may direct that the assembler press the locking button with a particular finger or with the thumb. This requirement can be enforced by use of a glove with the sensor only at the location that the assembler is supposed to use to press the locking button. For example, the assembler may be given a glove or finger cot that contains a sensor only on the thumb, requiring the assembler to press the locking button with their thumb.

The system using a hand-mounted force sensor to verify installation of a CPA-enabled electrical connector is comprised of a CPA-enabled electrical connector with a locking button; at least one hand-mounted force sensor; an interface board; a transmission channel from the force sensor to the interface board; a system processor, non-transitory computer readable memory element, display, and input; and a transmission channel from the interface board to the system processor. In an alternative embodiment, the system further comprises a communications board and a transmission channel from the communication board to the system processor, non-transitory computer readable memory element, display, and an input. In this embodiment, the transmission channel from the interface board to the system processor is made via a transmission channel from the interface board to the communication board and a transmission channel from the communication board to the system processor. Such an arrangement may be desirable if there are a plurality of hand-mounted force sensors.

In an alternative embodiment, the system processor, non-transitory computer readable memory element, display, and input can be housed in a computer. The computer may be a laptop. In another alternative embodiment, the interface board and communication board may be integrated in a single device. In another alternative embodiment, the interface board and communication board may both be housed in a computer.

Transmission from the sensor to the interface board may be wired or wireless. Transmission from the interface board to the system processor may be wired, wireless, or a combination of wired and wireless. Transmission from the communication board to the system processor may be wired or wireless. Wired transmission may be either hard wired, or via a connector, such as a universal serial bus ("USB"). Wireless transmission may be made using a wireless communication protocol such as Bluetooth®, Wi-Fi, or other common protocols.

The display provides a visual indicator of whether the CPA-enabled connector is properly locked or if it failed to lock properly. The system may further comprise an audio indicator as an auxiliary output. The audio indicator would indicate whether the CPA-enabled connector was properly locked or if it failed to lock.

The method of this invention comprises the steps of mounting at least one force sensor so that it will record the force exerted when depressing a locking button of a CPA-enabled electrical connector; depressing the locking button of a CPA-enabled electrical connector; measuring the force required to depress the locking button of a CPA-enabled electrical connector; recording the force required to depress the locking button of the CPA-enabled electrical connector; comparing the force required to depress the locking button of the CPA-enabled electrical connector to a pre-determined threshold; passing the CPA-enabled electrical connector if the force required to depress the locking button of the CPA-enabled electrical connector was less than the pre-determined threshold; failing the CPA-enabled electrical connector if the force required to depress the locking button of the CPA-enabled electrical connector was greater than or equal to the pre-determined threshold; and providing visual indication of whether the CPA-enabled electrical connector passed or failed.

BRIEF DESCRIPTION OF THE DRAWINGS

The present invention, a system and method using a hand-mounted force sensor to verify installation of a CPA-enabled electrical connector, is illustrated with 14 drawings on 12 sheets.

DETAILED DESCRIPTION OF THE DRAWINGS

The following descriptions are not meant to limit the invention, but rather to add to the summary of invention, and illustrate the present invention, by offering and illustrating various embodiments of the present invention, a system and method using a hand-mounted force sensor to verify installation of a CPA-enabled electrical connector. While embodiments of the invention are illustrated and described, the embodiments herein do not represent all possible forms of the invention. Rather, the descriptions, illustrations, and embodiments are intended to teach and inform one skilled in the art without limiting the scope of the invention. For example, the present invention is illustrated with a CPA-enabled locking button on the plug. It is trivial to one skilled in the art to put the CPA-enabled locking button on the socket.

Figure 1:
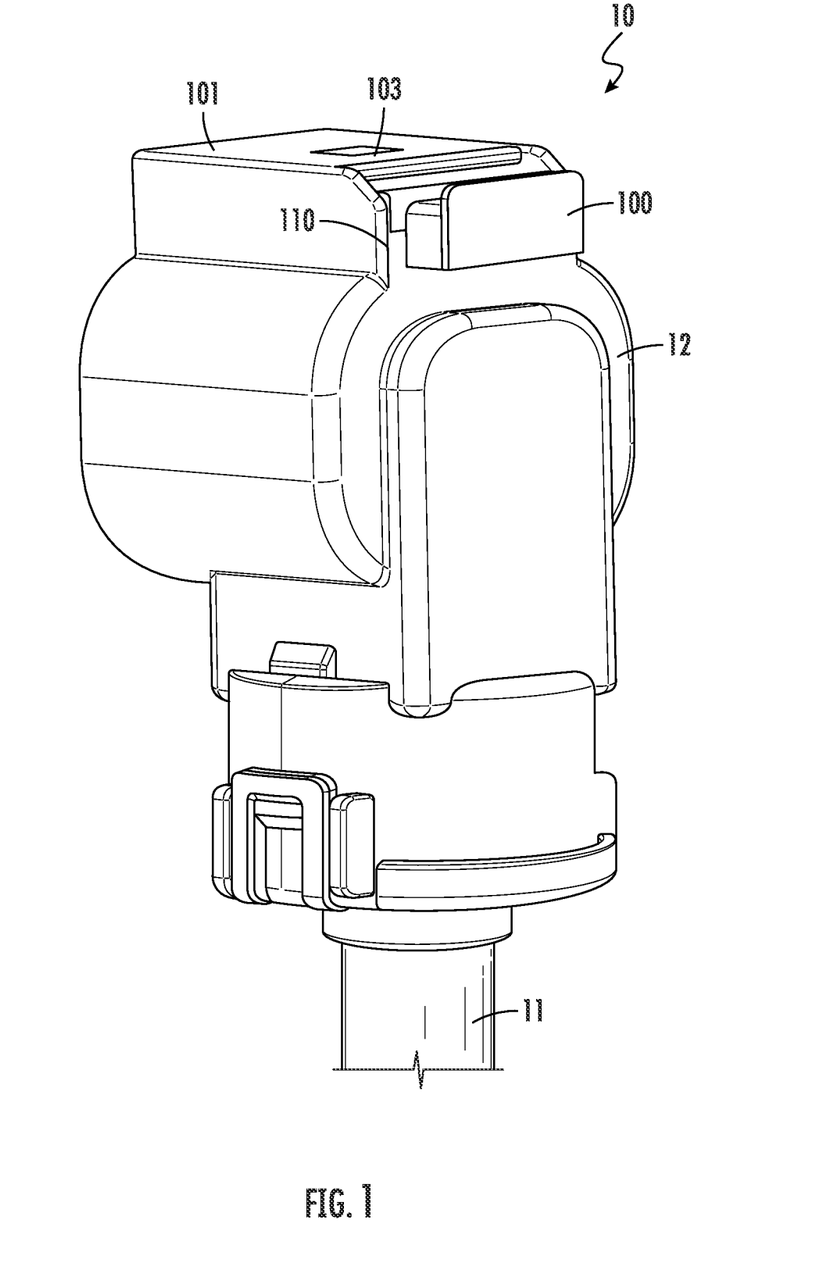
FIG. 1 is a perspective view of a plug with a CPA-enabled locking button.

FIGS. 1-4 show an embodiment of a connector plug 10 and socket 20 using a locking button 100 and locking tab 102. FIG. 1 shows the plug 10, which has a plug body 12, an electrical wire 11, and a CPA feature 101. The CPA feature 101 has a locking button 100, a visual indicator 103, and a locking ridge 110.

Figure 2:
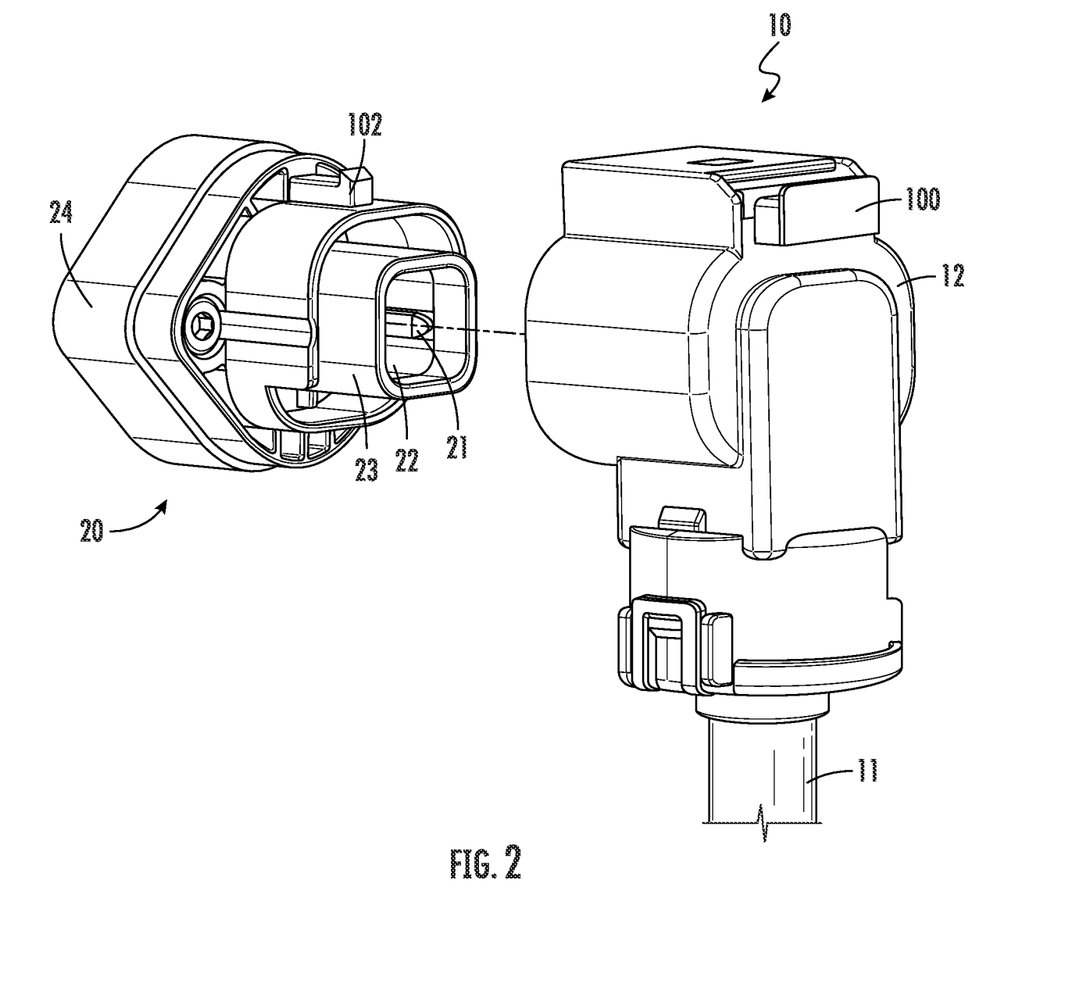
FIG. 2 is a perspective view of a plug and socket with a CPA-enabled locking button on the plug and a locking tab on the socket.

FIG. 2 shows the plug 10 and socket 20 in an unmated state. On the plug 10, one can see the plug body 12, the electrical wire 11, and the locking button 100. The socket 20 has a base 24, a connector housing 23, a connector cavity 22, and an electrical pin 21. The socket 20 has a locking tab 102, which will be captured when the plug 10 and socket 20 are mated, and the locking tab 102 on the plug 10 is pressed.

Figure 3:
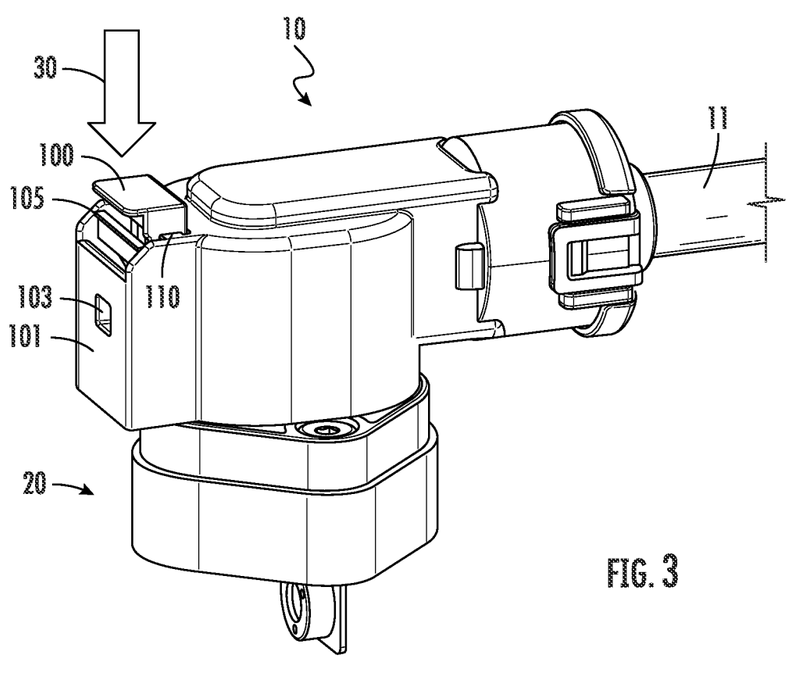
FIG. 3 is a perspective view of a CPA-enabled connector in which the plug has been inserted into the socket, but the locking button has not yet been pressed.
Figure 4:
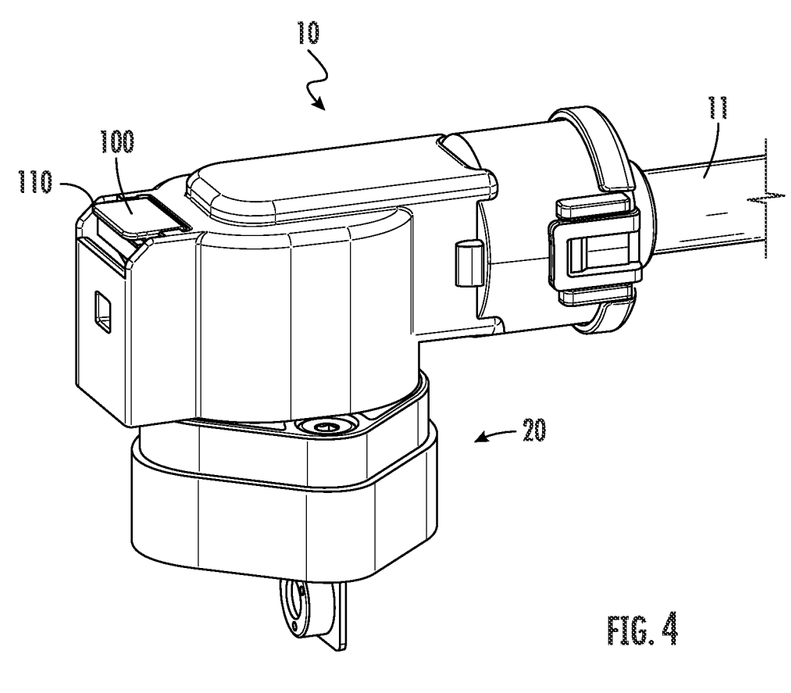
FIG. 4 shows a CPA-enabled connector in which the plug has been inserted into the socket and the locking button has been properly pressed.

FIG. 3 shows the plug 10 inserted into the socket 20, but the locking button 100 has not yet been depressed. Visible in this view are various aspects of the CPA-feature 101 on the plug 10: a lateral wall 105 that limits travel of the locking button 100; an edge 110 which should be flush with the locking button 100 after the locking button has been depressed; and a visual indicator 103. According to United States Council on Automotive Research ("USCAR"), a research and specification body for the U.S. automotive industry, the locking button 100 should require no more than 100N of downward force 30 to depress and capture the locking tab 102. FIG. 4 shows that once the locking button 100 has been pressed, the locking button 100 is flush with the edge 110 of the CPA feature 101.

Figure 5:
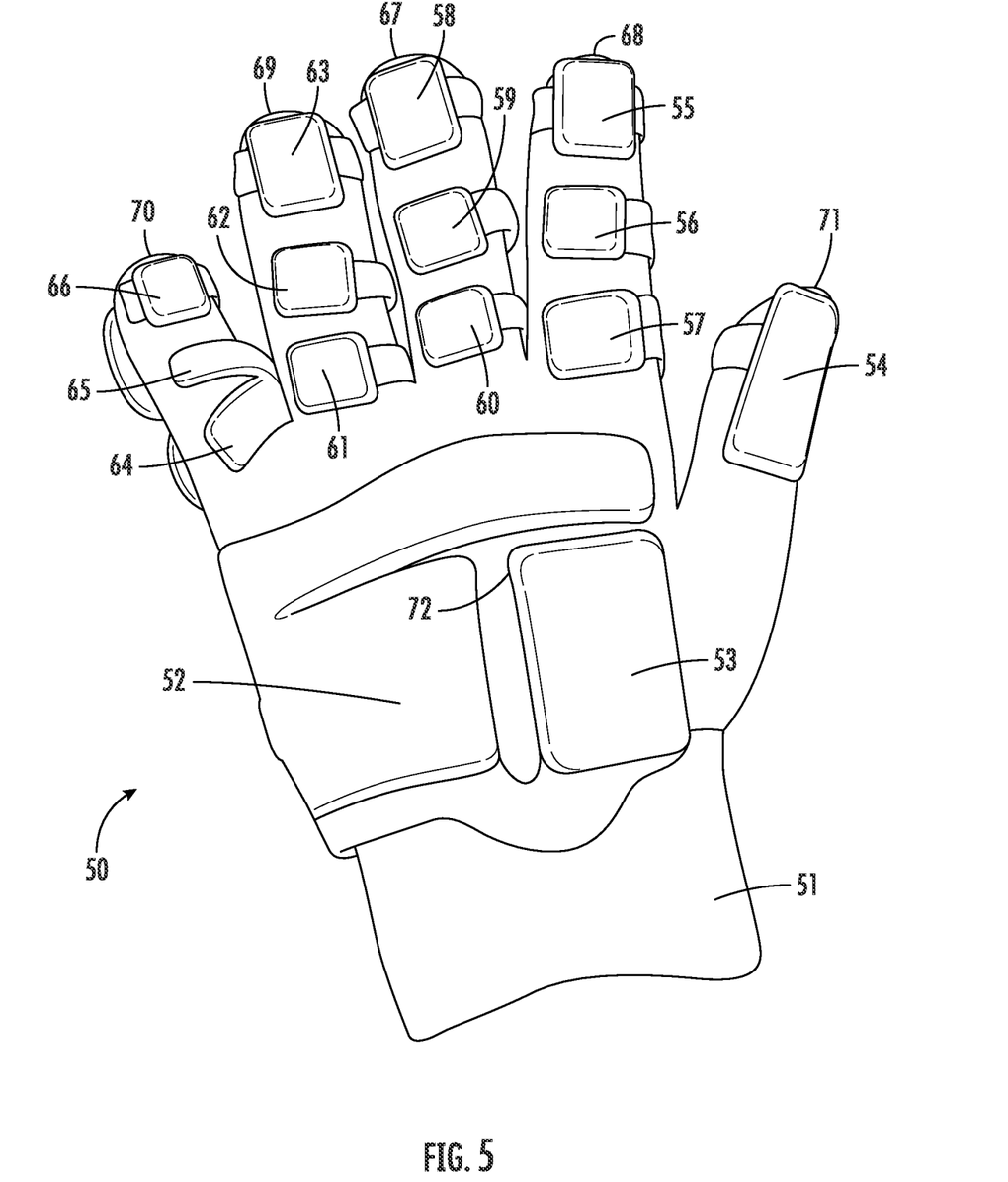
FIG. 5 is a top view of the palm-side of a glove with force sensors embedded across its surface.
Figure 6:
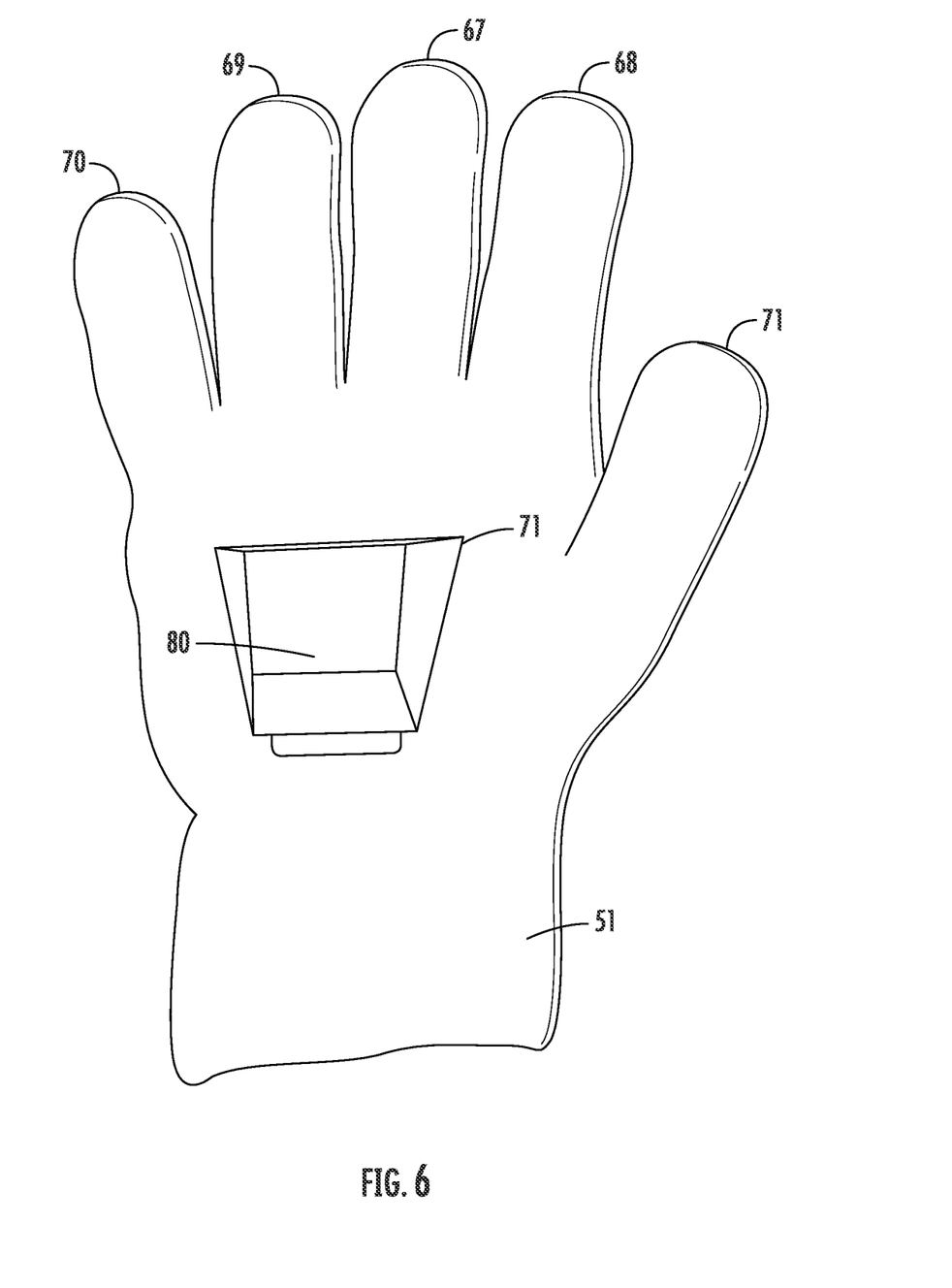
FIG. 6 is a top view of the back-hand-side of a glove with force sensors embedded across the surface of the palm-side of the glove.

FIG. 5 shows a glove 50 having a thumb 71, an index finger 68, a middle finger 67, a ring finger 69, a pinkie 70, and a palm 72. An elastic gather 51 provides for a secure fit at the wrist of the assembler. The glove 50 is instrumented with a plurality of force sensors 52, 53, 54, 55, 56, 57, 58, 59, 60, 61, 62, 63, 64, 65, 66. The fifteen force sensors 52, 53, 54, 55, 56, 57, 58, 59, 60, 61, 62, 63, 64, 65, 66 on this glove 50 may be over-kill, but they are used to illustrate that a force sensor or a plurality of force sensors can be embedded pretty much anywhere on the palm 72 surface of the glove. In practice, the most advantageous location for the force sensors are the thumb 71 (force sensor 54), the tip of the index finger 68 (force sensor 55), and the tip of the middle finger 67 (force sensor 58). FIG. 6 shows the back-hand-side 71 of the glove 50, having a thumb 71, an index finger 68, a middle finger 67, a ring finger 69, and a pinkie 70. Affixed to the back-hand-side 71 is an interface board 80, which takes the real-time force readings from the plurality of force sensors 52, 53, 54, 55, 56, 57, 58, 59, 60, 61, 62, 63, 64, 65, 66 and communicates them for recording. In this embodiment, communication from the interface board 80 to a computer or other recording device is done wirelessly.

Figure 7:
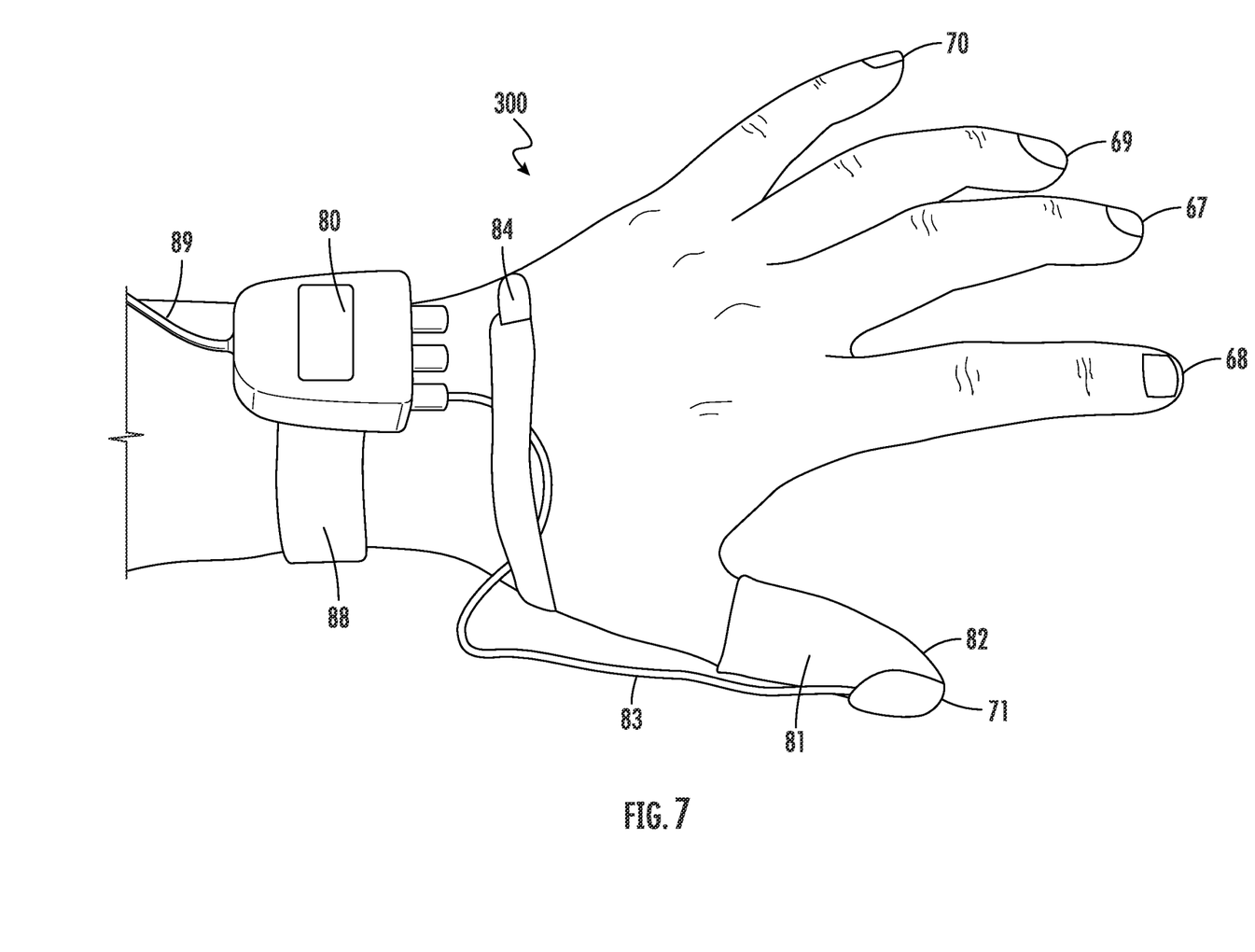
FIG. 7 is a perspective view of a thumb- and index-finger cot, which embedded force sensors, being worn.

FIGS. 5 and 6 show a glove 50 with a plurality of force sensors 52, 53, 54, 55, 56, 57, 58, 59, 60, 61, 62, 63, 64, 65, 66. FIG. 7 shows an alternative embodiment where a single force sensor 82 is mounted to the thumb 71 using a finger cot 81. The sensor 82 is connected to the interface board 80 with a with a lead wire 83. The interface board 80 is mounted to the hand 300 with a strap 88. The band 84 provides sufficient slack to the lead wire 83, without allowing the lead wire 83 to be tangled. In this embodiment, communication from the interface board 80 to a computer or other recording device is achieved with a wired 89 connection. This embodiment would be used if an assembler needed to maintain maximum tactile feel in their thumb 71, index finger 68, middle finger 67, ring finger 69, and pinkie 70.

Figure 8:
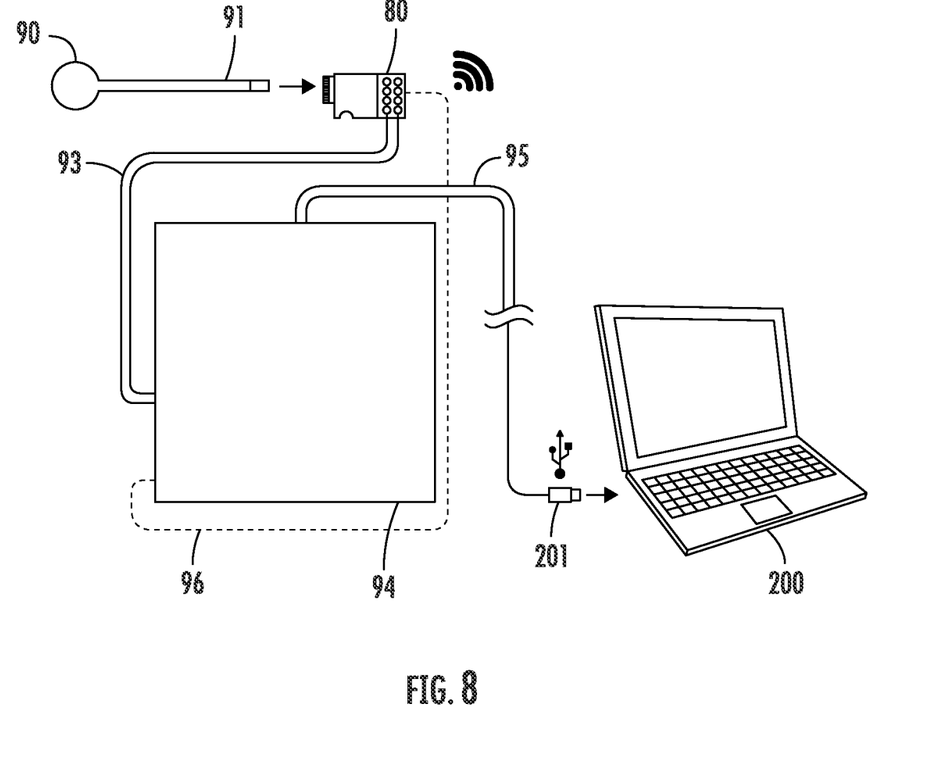
FIG. 8 is a system diagram showing a single force sensor, an interface board, a computer, and the connections between these devices.

FIG. 8 is a system diagram showing a single di-electric force sensor 90, an interface board 80, a communications board 94, a computer 200, and the connections between these devices. A round, dielectric force sensor 90 has an extended lead 91 that mates with the interface board 80. The interface board 80 takes the raw electrical output signal from the sensor 90 and converts it into a force. A wire 93 attaches the interface board 80 to the communications board 94. In an alternative embodiment, the interface board 80 can communicate with the communication board 94 via a wireless connection 96. In another embodiment, the system includes a plurality of sensors, as shown in FIGS. 5-6. Each of the plurality of force sensors 52, 53, 54, 55, 56, 57, 58, 59, 60, 61, 62, 63, 64, 65, 66 would receive its own interface board 80. As an alternative embodiment, the plurality of force sensors 52, 53, 54, 55, 56, 57, 58, 59, 60, 61, 62, 63, 64, 65, 66 would use a single, common interface board 80. In any event, the communication board 94 can receive input from a plurality of force sensors 52, 53, 54, 55, 56, 57, 58, 59, 60, 61, 62, 63, 64, 65, 66, whether transmitted from a plurality of interface boards 80, or from a single interface board 80. This would be done if an assembler wore a glove with multiple sensors 52, 53, 54, 55, 56, 57, 58, 59, 60, 61, 62, 63, 64, 65, 66 as shown in FIGS. 5 and 6. A single communication board 94 can also take the input from a plurality of interface boards 80 used by a smaller plurality of assemblers. In this embodiment, the communications board 94 is connected to the computer 200 with a wire 95. The computer 200 is a laptop 200, in this example. The connection is shown as a USB connector 201 with the laptop 200. In an alternative embodiment, the communication board 94 communicates with the processor of the computer 200 using a wireless protocol, such as Bluetooth or WiFi. In another alternative embodiment, the interface board 80 and communication board 94 can be integrated.

Figure 9:
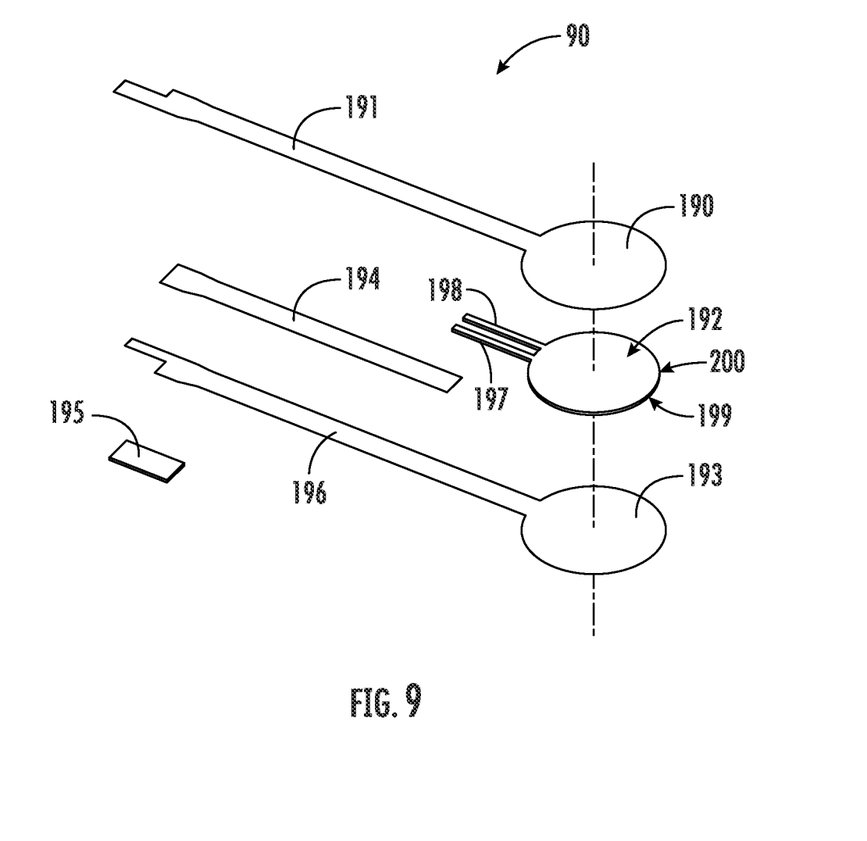
FIG. 9 is an exploded view of a dielectric force sensor.
Figure 10:
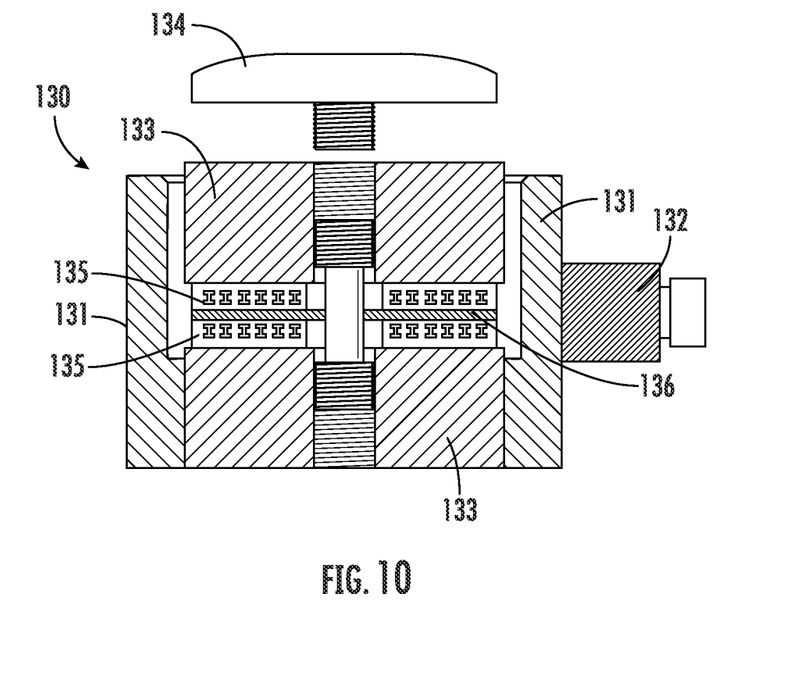
FIG. 10 is a side view of a piezo force sensor.
Figure 11:
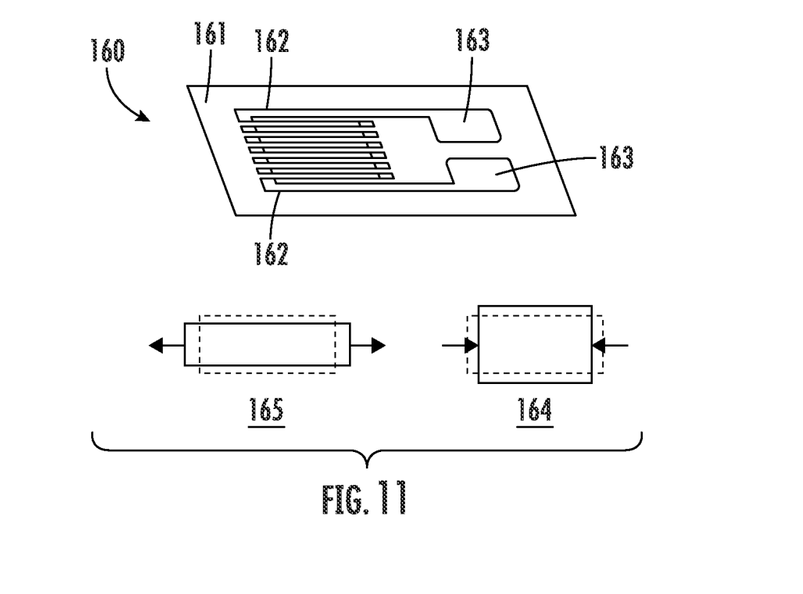
FIG. 11 is a perspective view of a force gauge built with metal wire and polyimide film.

FIGS. 9-11 show three variations of force sensors. Due to the forces required to lock a locking button 100 (less than 100N according to USCAR), almost any type of force sensor will be both reliable and accurate for the present invention 1. FIG. 9 shows a dielectric force sensor 90. The sensor 90 is constructed with a dielectric 200 disposed between a top electrode 192 and a bottom electrode 199. Two lead wires 197, 198 output an electrical signal that is proportional to the force between the top electrode 192 and the bottom electrode 199. A polyimide disc 190 covers the top electrode 192. A polyimide disc 193 covers the bottom electrode 199. A polyimide header 191 covers the two lead wires 197, 198, and joins with the polyimide disc 190 covering the top electrode 192. Likewise, a polyimide header 196 covers the two lead wires 197, 198, and joins with the polyimide disc 193 covering the bottom electrode 200. The two lead wires 197, 198 are glued 194 between the two polyimide headers 191, 196. A force between the top electrode 192 and the bottom electrode 199 produces an electrical signal in the two lead wires 197, 198 that is proportional to the force.

FIG. 10 shows a cross-section of a piezo-electric force sensor 130. A charge-collection plate 136 is placed between two quartz layers 135. The charge-collection plate 136 and two quartz layers 135 are embedded in a compound housing 133, 131. A cylindrical shell 131 contains the charge-collection plate 136, two quartz layers 135, and two housing members 133. A force cap 134 properly distributes the force over the upper housing member 133 so that the force is communicated to the two quartz layers 135 without damaging the quartz layers 135. The charge-collection plate 136 is connected to a lead 132. The current coming out of the lead 132 will be proportional to the force applied to the force cap 134.

FIG. 11 shows a cross-section of a metal-wire on substrate force sensor 160. This sensor 160 has a plurality of metal wire traces 162 on a polymer substrate 161. The metal traces 162 are loops of wire that resemble a flattened sinusoid, as shown in FIG. 11. The metal wire traces 162 terminate in metal pads 163. If a voltage is applied between the two metal pads 163, changes in the current will be proportional to the force applied. This type of sensor 160 is capable of recording both compressive 164 and tensile 165 forces.

Figure 12:
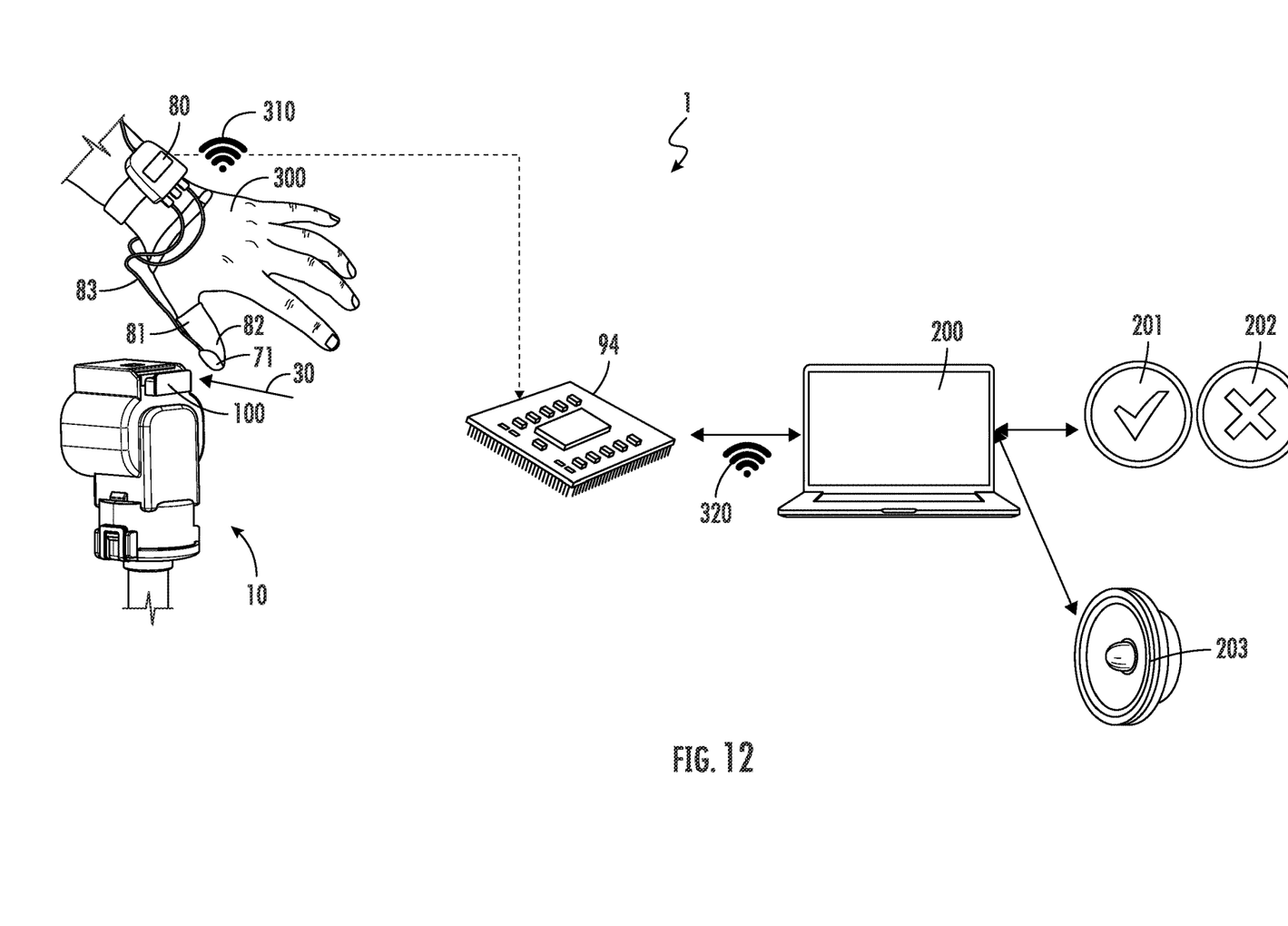
FIG. 12 is a system diagram of the present invention.

FIG. 12 shows a system diagram of the present invention 1. A force sensor 82 is mounted to the hand 300 of an assembler to measure the force 30. In this embodiment, the sensor 82 is affixed to the thumb 71 with a finger cot 81. A wire 83 connects the sensor 82 to the interface board 80. When the assembler presses the locking button 100 of a CPA-enabled connector 10, 20, the sensor 82 measures the force 30 and transmits it to the interface board 80. In this embodiment, the interface board 80 wirelessly transmits 310 it to a communications board 94. The communications board 94, in turn, wirelessly transmits 320 the result to a laptop 200. The laptop 200 provides a visual indicator of whether the CPA-enabled connector is properly locked 201 or if it failed to lock properly 202. The laptop 200 can also be connected to an auxiliary output, such as a speaker 203, to provide an audio indicator 203 of whether the CPA-enabled connector was properly locked 201 or if it failed to lock 202. The laptop 200 has a processor, a non-transitory computer readable memory, and an input. The laptop 200 input can be a wireless chipset, such as Bluetooth; or it can be a wired connection, such as USB. The laptop 200 stores the results of the measurement on its non-transitory computer readable memory.

Figure 13:
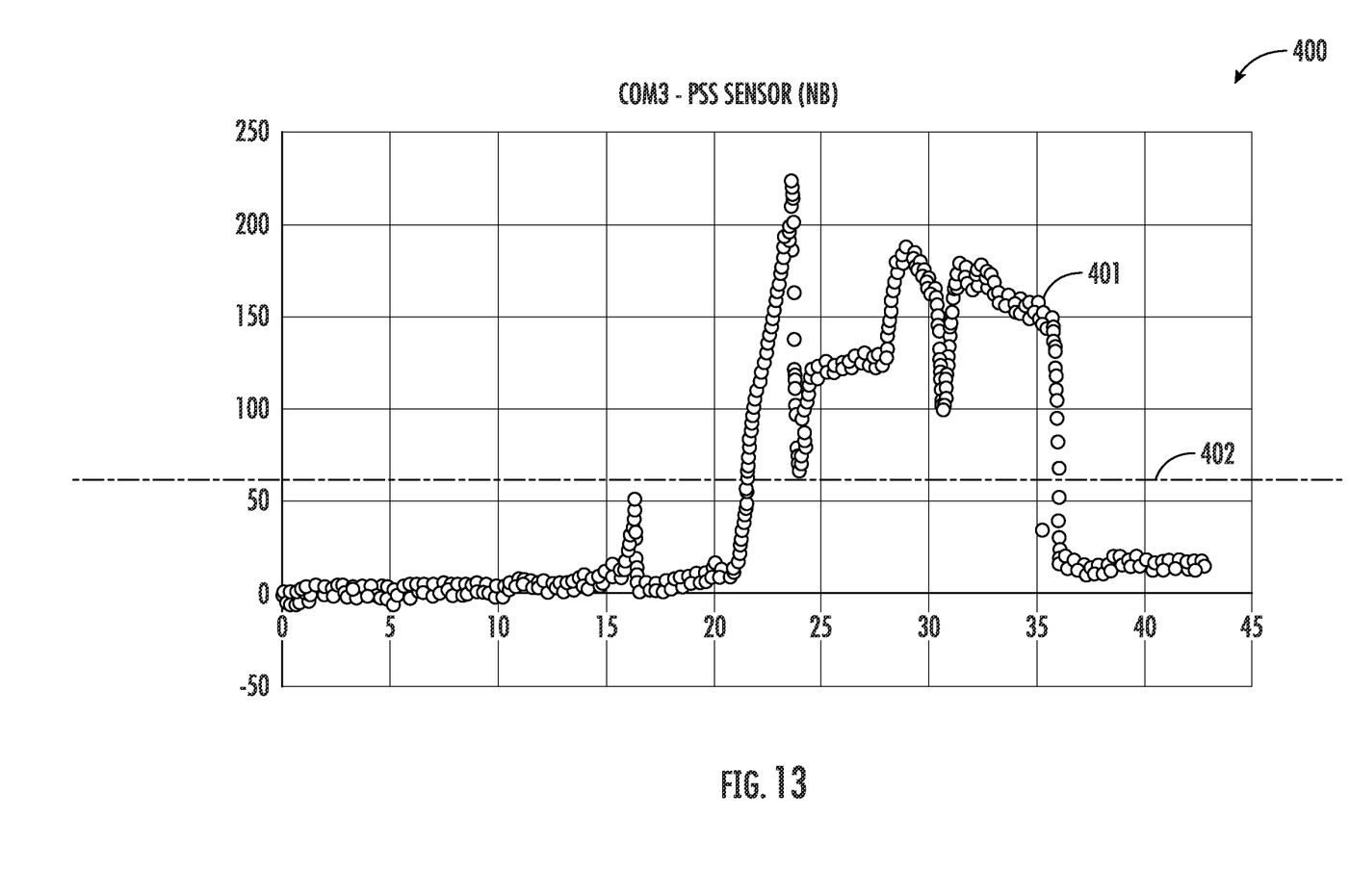
FIG. 13 is a force graph of a failed connector.
Figure 14:
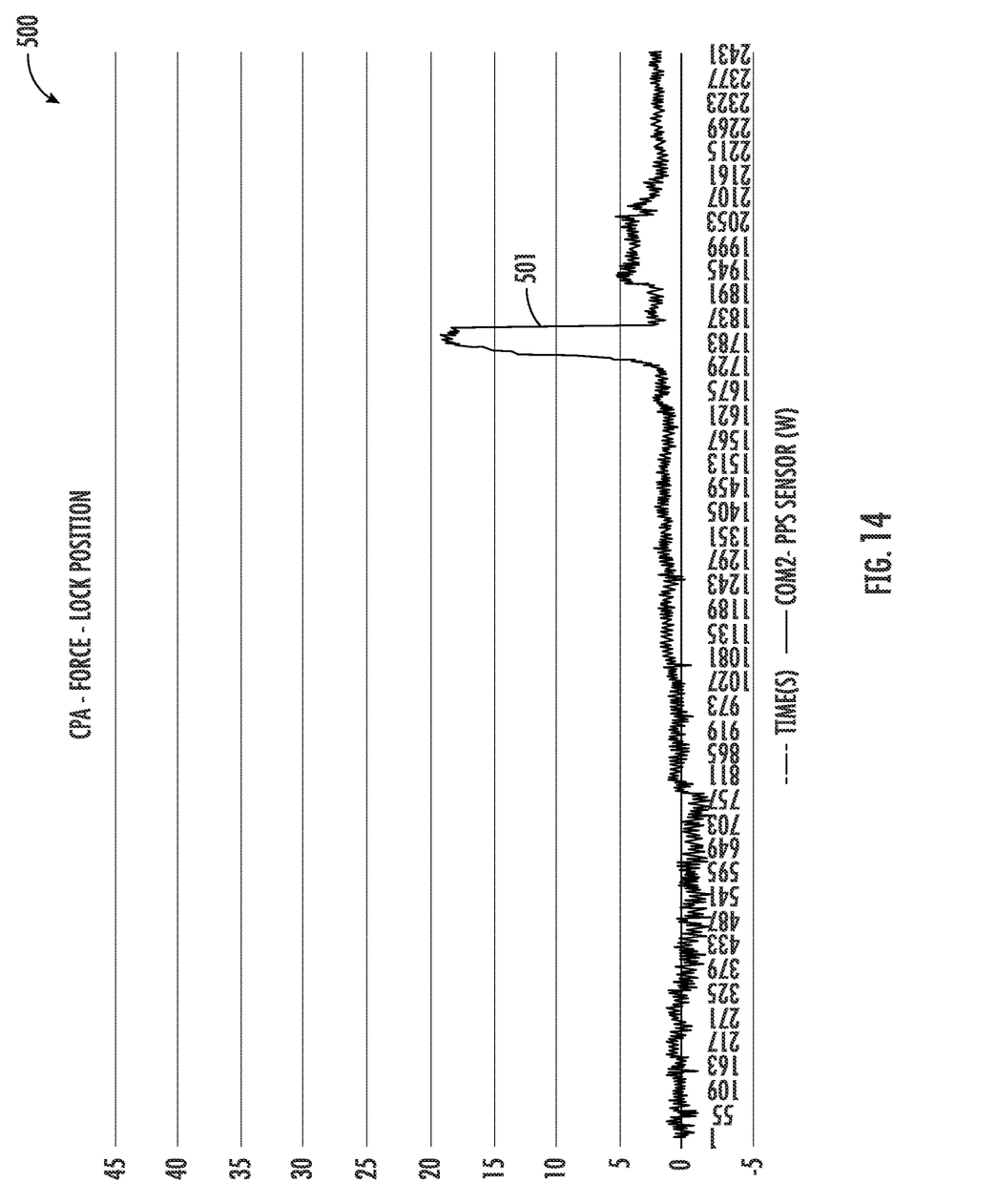
FIG. 14 is a force graph of a correctly installed connector.

FIG. 13 shows a force versus time curve 400 for a CPA-enabled connector which failed to properly lock when recorded using the system 1 described above. Force is on the Y-axis in Newtons; time is on the X-axis in milliseconds. The force 401 exceeds 200N. The pass-fail threshold 402 is set at 60 N. FIG. 14 shows a force versus time curve 500 for a CPA-enabled connector which is properly locked when using the system 1 described above. Force is on the Y-axis in Newtons; time is on the X-axis in milliseconds. In this example, the force 501 never exceeds 20N.

The method of this invention comprises the steps of mounting at least one force sensor so that it will record the force exerted when depressing a locking button of a CPA-enabled electrical connector; depressing the locking button of a CPA-enabled electrical connector; measuring the force required to depress the locking button of a CPA-enabled electrical connector; recording the force required to depress the locking button of the CPA-enabled electrical connector; comparing the force required to depress the locking button of the CPA-enabled electrical connector to a pre-determined threshold; passing the CPA-enabled electrical connector if the force required to depress the locking button of the CPA-enabled electrical connector was less than the pre-determined threshold; failing the CPA-enabled electrical connector if the force required to depress the locking button of the CPA-enabled electrical connector was greater than or equal to the pre-determined threshold; and providing visual indication of whether the CPA-enabled electrical connector passed or failed.

In an alternative embodiment, the method further comprises the steps of transmitting the measured force from the sensor to an interface board; transmitting the measured force from the interface board to a communications board; and transmitting the measured force from the communications board to a laptop. Transmission may be accomplished using a wireless protocol, or via a wired connection. The laptop 200 has a processor, a non-transitory computer readable memory, and an input. The laptop 200 input can be a wireless chipset, such as BlueTooth; or it can be a wired connection, such as USB. This alternative embodiment further comprises the additional step of storing on the non-transitory computer readable memory of the laptop 200 the results of a measurement of the force required to lock the locking button on a CPA-enabled electrical connector. This alternative embodiment further comprises the additional step of storing on the non-transitory computer readable memory of the laptop 200 a comparison of the results of a measurement of the force required to lock the locking button on a CPA-enabled electrical connector and a pass-fail threshold 402. This alternative embodiment further comprises the additional step of storing on the non-transitory computer readable memory of the laptop 200 the results from a plurality of CPA-enabled electrical connectors in a unique and traceable record. In other words, this method allows a factory to determine the force required to lock a particular locking button on a particular CPA-enabled electrical connector.

In an alternative embodiment, the method further comprises the step of providing audio indication of whether the CPA enabled electrical connector passed or failed.

We claim:

1. A system using a hand-mounted force sensor to verify installation of a CPA-enabled electrical connector comprised of
    a CPA-enabled electrical connector with a locking button capable of being depressed;
    a hand-mounted force sensor;
    an interface board;
    a transmission channel from the force sensor to the interface board;
    a system processor;
    a non-transitory computer readable memory element;
    a display;
    an input;
    a transmission channel from the interface board to the system processor; and
    wherein the force sensor contacts the locking button when the locking button is depressed.

2. The system using a hand-mounted force sensor to verify installation of a CPA-enabled electrical connector of claim 1, wherein the force sensor measures the force required to depress the locking button.

3. The system using a hand-mounted force sensor to verify installation of a CPA-enabled electrical connector of claim 2, wherein the force sensor is embedded on a glove.

4. The system using a hand-mounted force sensor to verify installation of a CPA-enabled electrical connector of claim 2, wherein the force sensor is embedded on a finger cot.

5. The system using a hand-mounted force sensor to verify installation of a CPA-enabled electrical connector of claim 2, wherein the force sensor has an electrical output that is proportional to the force applied to the force sensor.

6. The system using a hand-mounted force sensor to verify installation of a CPA-enabled electrical connector of claim 5, wherein the force sensor is constructed as two polyimide-coated electrodes with a dielectric disposed between them, and wherein the force sensor produces an electrical output that is proportional to the force applied between the two polyimide-coated electrodes.

7. The system using a hand-mounted force sensor to verify installation of a CPA-enabled electrical connector of claim 5, wherein the force sensor is constructed with a cylindrical housing containing a charge-collection plate disposed between two quartz layers, and wherein the sensor produces an electrical output from the charge-collection plate that is proportional to the force applied to the two quartz layers.

8. The system using a hand-mounted force sensor to verify installation of a CPA-enabled electrical connector of claim 5, wherein the force sensor is constructed as a loop of metal wire on a substrate; wherein the loop metal wire resembles a flattened sinusoid having two ends, each end terminating in a metal pad; and wherein the sensor produces an electrical output that is proportional to the force applied to the sensor.

9. The system using a hand-mounted force sensor to verify installation of a CPA-enabled electrical connector of claim 5 wherein the force required to depress the locking button is transmitted as an electrical output from the sensor through the transmission channel to the interface board.

10. The system using a hand-mounted force sensor to verify installation of a CPA-enabled electrical connector of claim 9, wherein the transmission channel between the force sensor and the interface board is a wire.

11. The system using a hand-mounted force sensor to verify installation of a CPA-enabled electrical connector of claim 9, wherein the transmission channel between the force sensor and the interface board is wireless, using a wireless communication protocol.

12. The system using a hand-mounted force sensor to verify installation of a CPA-enabled electrical connector of claim 9, wherein the interface board is hand-mounted.

13. The system using a hand-mounted force sensor to verify installation of a CPA-enabled electrical connector of claim 9, further comprising a board that has functionality to serve as both the interface board and the communication board.

14. The system using a hand-mounted force sensor to verify installation of a CPA-enabled electrical connector of claim 9, further comprising a communication board, a transmission channel between the interface board and the communication board, and a transmission channel between the communication board and the system processor, wherein the transmission channel between the interface board and the system processor is comprised of the communication board between the interface board and the communication board and the transmission channel between the communication board and the system processor.

15. The system using a hand-mounted force sensor to verify installation of a CPA-enabled electrical connector of claim 14, wherein the force required to depress the locking button is transmitted as an electrical signal from the interface board to the communication board through the transmission channel between the interface board and communication board.

16. The system using a hand-mounted force sensor to verify installation of a CPA-enabled electrical connector of claim 15, wherein the transmission channel between the interface board and the communication board is a wire.

17. The system using a hand-mounted force sensor to verify installation of a CPA-enabled electrical connector of claim 15, wherein the transmission channel between the interface board and the communication board is wireless, using a wireless communication protocol.

18. The system using a hand-mounted force sensor to verify installation of a CPA-enabled electrical connector of claim 14, wherein the force required to depress the locking button is transmitted as an electrical signal from the communication board to the system processor through the transmission channel between the communication board and the system processor.

19. The system using a hand-mounted force sensor to verify installation of a CPA-enabled electrical connector of claim 18, wherein the transmission channel between the communication board to the system processor is a wire.

20. The system using a hand-mounted force sensor to verify installation of a CPA-enabled electrical connector of claim 18, wherein the transmission channel between the communication board to the system processor is wireless, using a wireless communication protocol.

21. The system using a hand-mounted force sensor to verify installation of a CPA-enabled electrical connector of claim 9, further comprising at least one additional hand-mounted force sensor.

22. The system using a hand-mounted force sensor to verify installation of a CPA-enabled electrical connector of claim 21, further comprising at least one additional interface board, so that the number of interface boards and the number of hand-mounted force sensors is equal.

23. The system using a hand-mounted force sensor to verify installation of a CPA-enabled electrical connector of claim 9, wherein the system processor, non-transitory computer readable memory element, display, output, and input are housed in a computer.

24. The system using a hand-mounted force sensor to verify installation of a CPA-enabled electrical connector of claim 23, wherein the computer is a laptop.

25. A method of using a hand-mounted force sensor to verify the installation of a CPA-enabled electrical connector comprising the steps of
  using at least one hand-mounted force sensor so that it will record the force exerted when depressing a locking button of a CPA-enabled electrical connector;
  depressing the locking button of a CPA-enabled electrical connector;
  measuring a force required to depress the locking button of a CPA-enabled electrical connector;
  recording the force required to depress the locking button of the CPA-enabled electrical connector;
  comparing the force required to depress the locking button of the CPA-enabled electrical connector to a pre-determined threshold;
  passing the CPA-enabled electrical connector if the force required to depress the locking button of the CPA-enabled electrical connector was less than the pre-determined threshold;
  failing the CPA-enabled electrical connector if the force required to depress the locking button of the CPA-enabled electrical connector was greater than or equal to the pre-determined threshold; and
  providing an indication of whether the CPA-enabled electrical connector passed or failed.

26. The method of using a hand-mounted force sensor to verify the installation of a CPA-enabled electrical connector of claim 25, wherein indication is presented visually.

27. The method of using a hand-mounted force sensor to verify the installation of a CPA-enabled electrical connector of claim 25, wherein indication is presented auditorily.

28. The method of using a hand-mounted force sensor to verify the installation of a CPA-enabled electrical connector of claim 25, wherein indication is presented both visually and auditorily.

29. The method of using a hand-mounted force sensor to verify the installation of a CPA-enabled electrical connector of claim 25 comprising the further steps of
  depressing the locking button of at least one additional CPA-enabled electrical connector;
  measuring the force required to depress the locking button of the at least one additional CPA-enabled electrical connector;
  recording the force required to depress the locking button of the at least one additional CPA-enabled electrical connector;
  comparing the force required to depress the locking button of the at least one additional CPA-enabled electrical connector to a pre-determined threshold;
  passing the CPA-enabled electrical connector if the force required to depress the locking button of the at least one additional CPA-enabled electrical connector was less than the pre-determined threshold;
  failing the CPA-enabled electrical connector if the force required to depress the locking button of the at least one additional CPA-enabled electrical connector was greater than or equal to the pre-determined threshold; and
  providing visual indication of whether the CPA-enabled electrical connector passed or failed.

30. The method of using a hand-mounted force sensor to verify the installation of a CPA-enabled electrical connector of claim 25 comprising the further steps of
transmitting the measured force from the at least one sensor to an interface board;
transmitting the measured force from the interface board to a communications board;
and transmitting the measured force from the communications board to a laptop.

31. The method of using a hand-mounted force sensor to verify the installation of a CPA-enabled electrical connector of claim 30, wherein at least one step of transmission is accomplished wirelessly, using a wireless protocol.

32. The method of using a hand-mounted force sensor to verify the installation of a CPA-enabled electrical connector of claim 31, wherein all steps of transmission are accomplished wirelessly, using a wireless protocol.

33. The method of using a hand-mounted force sensor to verify the installation of a CPA-enabled electrical connector of claim 30, wherein at least one step of transmission is accomplished using a wired connection.

34. The method of using a hand-mounted force sensor to verify the installation of a CPA-enabled electrical connector of claim 33, wherein all steps of transmission are accomplished using a wired connection.

* * * * *